Patented Jan. 8, 1952

2,581,919

UNITED STATES PATENT OFFICE 2,581,919

AROMATIC HYDROXY SULFIDES

Harry E. Albert, Akron, Ohio, assignor to The Firestone Tire & Rubber Company, Akron, Ohio, a corporation of Ohio No Drawing. Application January 26, 1946, Serial No. 643,828

3 Claims. (Cl. 260—609)

This invention relates to the dicresol sulfides prepared from dialkylated meta-cresols, having a total of at least 6 carbon atoms and no more than about 20 atoms in the two alkyl substituents. Preferably, each alkyl substituent contains at least 3 carbon atoms and may contain up to about 10 carbon atoms. These dicresol sulfides have been found useful as softening agents for reclaiming vulcanizates, such as cured rubber-like copolymers of butadiene and styrene which are not softened by the reclaiming agents commonly used in vulcanizing cured natural rubber (my copending application Serial No. 753,361).

The dicresol sulfides of this invention also have value as stabilizers for synthetic rubber latices, such as latices of rubber-like copolymers of (1) butadiene and styrene and (2) butadiene and acrylonitrile. They are also stabilizers for the coagulated copolymers.

The di(dialkyl cresol) sulfides of this invention include the monosulfides, the disulfides, and the polysulfides. The following formula represents the various dicresol sulfides of this invention:

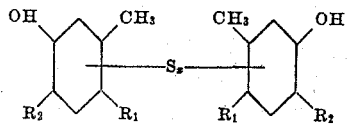

in which $R_1$ and $R_2$ are alkyl groups, the sum of whose carbon atoms equals 6 to about 20, and $R_1$ and $R_2$ each preferably contain 3 to about 10 carbon atoms, and $x$ is 1 to 4. The term "sulfides" as used in this text, therefore, includes monosulfide, disulfide, and polysulfides.

The preferred reclaiming agents are di(3-methyl-4,6-di-tertiary-butylphenol) sulfides and di-(3 - methyl - 4,6 - tertiary - amylphenol) sulfides. Other dialkyl cresol sulfides of the invention include:

di(3-methyl-4,6-di-tertiary - butylphenol) disulfide
di(3-methyl-4,6-di-tertiary - amylphenol) disulfide
di(3-methyl-4,6-diheptylphenol) monosulfide
di(3-methyl-4,6-diheptylphenol) disulfide
di(3-methyl-4,6-di-tertiary - butylphenol) polysulfide
di(3-methyl-4,6-di-isopropylphenol) monosulfide
di(3-methyl-4,6-di-isopropylphenol) disulfide
di(3-methyl-4,6-di-isopropylphenol) polysulfide
di(3-methyl-4-tertiary-butyl-6-isopropylphenol) monosulfide
di(3-methyl-4-ethyl-6-undecylphenol) monosulfide
di(3-methyl-4-undecyl-6-ethylphenol) monosulfide
di(3-methyl-4,6-didecylphenol) monosulfide
di(3-methyl-4-butyl-6-ocylphenol) monosulfide
di(3-methyl-4-tertiary-butyl-6-octylphenol) disulfide The dialkylated cresols from which the sulfides of this invention are prepared are known commercially. The sulfides are preferably prepared from these compounds by reaction with a sulfur chloride in solution in an inert solvent, such as carbon tetrachloride or ethylene dichloride, etc. When sulfur monochloride, $S_2Cl_2$, is used, the product probably contains in addition to the monosulfide of the dialkylated cresol some disulfide and tertasulfide as well as free sulfur. For the preparation of the dialkylated cresol monosulfide which is preferred for reclaiming, the reaction is preferably carried out with sulfur dichloride, $SCl_2$, and advantageously at room temperature. The following examples illustrate the invention:

EXAMPLE 1

SULFUR DICHLORIDE METHOD

*Di(4,6-di-tertiary-butyl-3-methylphenol) sulfide*

Forty grams of 4,6-di-tertiary-butyl-3-methylphenol were dissolved in 400 ml. of carbon tetrachloride. To this 9.4 grams of sulfur dichloride were added over a 1½-hour period at room temperature. After the addition had been completed, the reaction mixture was allowed to stand several hours, and then it was refluxed for 3 hours. The crude dicresol sulfide was obtained by evaporating the solvent. It was a reddish-brown resin which was solid at room temperature and liquid at 100° C.

EXAMPLE 2

SULFUR MONOCHLORIDE METHOD

*Di(4,6-di-tertiary-butyl-3-methylphenol) sulfide*

Two hundred and twenty grams of 4,6-di-tertiary-butyl-m-cresol were dissolved in 330 grams of carbon tetrachloride over a 45-minute period. A solution of 67.5 grams of sulfur monochloride in 50 grams of carbon tetrachloride was added. The reaction mixture was refluxed for 2 hours, and then dry air was blown through the solution to remove any hydrogen chloride. The dicresol sulfide was obtained by evaporating the solvent. The yield of crude product was quantitative. It was a reddish-brown resin which was solid at room temperature and liquid at 100° C. On cooling from 100° C., solidification started at 80° C.

A portion of the product was recrystallized 3 times from benzene. It was then found to have a melting point of 296–208° C., uncorrected. Analysis of this purified compound for sulfur by the micro Carius method gave the following results:

Sulfur: calculated for $C_{30}H_{46}O_2S$, 6.82 per cent; found, 6.38 per cent.

The other di(4,6-dialkyl-meta-cresol) sulfides of this invention may be similarly prepared. Other methods of preparation may be employed.

What I claim is:

1. Di(4,6-di-tertiary-butyl - meta - cresol) sulfides.
2. Di(4,6-di-tertiary-butyl-meta-cresol) monosulfide.
3. The reaction product of sulfur monochloride and 4,6-di-tertiary-butyl-meta-cresol.

HARRY E. ALBERT.

REFERENCES CITED

The following references are of record in the file of this patent:

UNITED STATES PATENTS

| Number | Name | Date |
| --- | --- | --- |
| 1,912,588 | Moses et al. | June 6, 1933 |
| 2,256,441 | Rieff | Sept. 16, 1941 |
| 2,256,443 | Rieff | Sept. 16, 1941 |
| 2,270,183 | Cook | Jan. 13, 1942 |
| 2,364,338 | Beaver | Dec. 5, 1944 |
| 2,379,756 | Sibley | Mar. 6, 1945 |
| 2,381,854 | Rieff | Aug. 7, 1945 |
| 2,402,448 | Richards | June 18, 1946 |
| 2,409,687 | Rogers et al. | Oct. 22, 1946 |
| 2,449,026 | Gilder | Sept. 7, 1948 |